United States Patent [19]
Hull et al.

[11] Patent Number: 5,775,451
[45] Date of Patent: Jul. 7, 1998

[54] METHOD OF OPERATING A VEHICLE CRUISE CONTROL SYSTEM

[76] Inventors: Harold L. Hull, 401 Caryon Way #43; Howard H. McMaster; Sandra A. McMaster, both of 1490 Shadow La., all of Sparks, Nev. 89434

[21] Appl. No.: 702,848

[22] Filed: Aug. 26, 1996

[51] Int. Cl.⁶ .................................................. B60K 31/04
[52] U.S. Cl. ............................ 180/170; 180/179; 701/93
[58] Field of Search .................... 701/93; 318/587, 318/609; 180/170, 176, 177, 178, 179; 307/10.1; 345/172

[56] References Cited

U.S. PATENT DOCUMENTS

| | | | |
|---|---|---|---|
| 3,406,775 | 10/1968 | Maghuski | 180/176 X |
| 4,180,713 | 12/1979 | Gonzales | 200/52 R |
| 4,590,370 | 5/1986 | NaRajima et al. | 364/426 |
| 4,701,629 | 10/1987 | Citroën | 307/10 R |
| 5,154,250 | 10/1992 | Murai | 180/179 |
| 5,197,563 | 3/1993 | Sakonju et al. | 180/176 |
| 5,209,318 | 5/1993 | Miyahara et al. | 180/178 |
| 5,315,900 | 5/1994 | Teeter | 477/165 |
| 5,335,743 | 8/1994 | Gillbrand et al. | 180/178 |
| 5,513,107 | 4/1996 | Gormly | 364/424.05 |
| 5,684,374 | 11/1997 | Chaffee | 318/609 X |

*Primary Examiner*—Brian L. Johnson
*Assistant Examiner*—Michael Mar

[57] ABSTRACT

The present invention relates to devices used to activate cruise Systems within a vehicle, but more particularly relates to a combination including a cruise control system which is activated by a typical ten-key pad, such as used with adding machines, TV remote control pads, numerical keys on a computer, etc.

2 Claims, 2 Drawing Sheets

METHOD OF OPERATING A VEHICLE CRUISE CONTROL SYSTEM

FIELD OF THE INVENTION

The present invention relates to devices used to activate cruise systems within a vehicle, but more particularly relates to a cruise control system which is activated by a typical ten-key pad, such as used with adding machines, TV remote control pads, numerical keys on a computer, etc.

BACKGROUND OF THE INVENTION

In the past many different types of cruise control systems have been taught. However, nowhere in the prior art do they teach the unique combination of a cruise control system which may be activated by use of a typical ten-key control pad, such as taught by the present invention.

Each of the various cruise control systems within the prior art do not address specifically the control means by which the systems may be actuated. It is therefore contended by the applicants that within the references, nowhere has it been addressed, nor recognized that a cruise control system which is actuated by a typical ten-key pad would be most advantageous and most desirable. The only prior art references which even suggest that a specific type of actuation means would be desirable, are as follows: U.S. Pat. No. 5,335,743 wherein they provide a steering wheel for a vehicle which is fitted with a switch and when the switch is operated in mutually independent control directions, controls the acceleration and deceleration of the vehicle, as well as upward and downward gear changing, and activates one of a number of cruise control functions. This device is functional for its intended use, but has inherent disadvantages which the present invention addresses and eliminates. For example, due to the location of the switch device, the driver can only operate the switch when the steering wheel is in a normal straight-ahead position, and possible accidental activation is likely when the driver is turning the steering wheel which can be very dangerous in many circumstances. Also, operation of the switch is very complicated and the driver must train themselves how to operate the switch which can be very frustrating as well as time consuming. Unlike the present invention which can be positioned at a location of choice and which allows anyone having ten-key skills to easily operate the device and initiate cruise control therefrom.

U.S. Pat. No. 5,315,900, wherein they provide a transmission control lever having multiple switches thereon for controlling braking and a cruise control system. This device is again functional but still the driver of the vehicle must learn how to operate the various switches and again accidental activation is likely whenever the driver shifts the control lever.

U.S. Pat. No. 4,701,629 is a most interesting reference as they teach a uniquely designed switch control unit for a motor vehicle with the control unit being in the shape of the exterior surface of the vehicle and includes thereon multiple switches positioned at a location on the control unit which correspond with the various functions to be performed. However, again this control unit includes many switches and this device could not be operated by the well known ten-key pattern, and nowhere do they suggest and/or imply that this control unit could be used to control the cruise control system of a vehicle, as clearly taught within the present invention.

SUMMARY OF THE INVENTION

We provide a ten-key control pad which is used to operate a cruise control system within a vehicle. The control pad is of simple well known construction, such as commonly used on push button telephones, adding machines, TV remote control pads, numerical keys on a computer, etc., and may be either touch activated and/or push button actuated. The pad allows the driver of the vehicle to simply press the on/off button, press/touch the numerical keys equal to the desired speed of travel and then press enter. Also, the pad is programmable and allows the driver to pre-set the desired speed of travel from anywhere between 15 MPH to 65 MPH, without the need for the driver to take their eyes off of the road.

It is therefore an object of the present invention to provide a ten-key control pad which activates and deactivates various functions of a cruise control system of engineering choice from within a vehicle.

It is another object of the present invention to provide ten-key pad which is either portable and/or may be removably attached at a location of choice within a vehicle which allows the driver thereof to easily activate the cruise control system while driving, without the need to take their eyes off of the road.

Still another object of the present invention is to provide a ten-key pad which may be either touch activated and/or push-button activated.

Also, another object of the present invention is to provide a ten-key which may be battery operated if so desired, for example, similar to the remote control unit used for activating T.V.

Still a further object of the present invention is to provide a ten-key pad which includes an L.E.D. (light emitting diode) which illuminates when activated for night driving.

Yet another object of the present invention is to provide a ten-key pad which transmits to the receiving head the speed desired, then it transmits through the cruise control regulator, and servo, much in the same way as the present day cruise controls.

Also, a unique feature of the present invention is to allow the driver to pre-set the ten-key pad i.e., from 15 MPH to 65 MPH without taking your eyes off of the road.

Yet another object of the present invention is to provide a ten-key pad and cruise control system in combination which substantially anyone can easily use, as the typical ten-key pad is used most everyday by most individuals, when either at home or at work.

Still further, an object of the present invention is to provide a ten-key pad for actuating a cruise control system which can be easily installed at substantially any location of choice within a vehicle, for example, if so desired, the ten-key pad can be installed on the shifting lever of the vehicle with only one 12 volt connection.

Yet another object of the present invention is to provide a ten-key pad and cruise control system which in combination solves or eliminates the present day wiring of conventional cruise control heads.

Also, another object of the present invention is to provide a ten-key pad and cruise control system in combination which allows the driver to easily set the desired speed of travel without the need to visually watch the speed indicator, as necessitated within the prior art.

Still another object of the present invention is to provide a ten-key operated control pad for activation of a cruise control system within a vehicle, which when used in combination, will provide most unusual results and allow a driver to easily activate the cruise control system by use of the ten-key pad and well known ten-key pattern. This advantage and unique combination has not been taught within the prior art, nor has it been suggested and/or recognized.

Still a further object of the present invention is to provide a ten-key control pad which will not allow the driver to set a speed of travel for more than 65 MPH. This is not only economical, thus saving fuel, ware and tear on the vehicle, but also would be most favorable with law enforcement officials, and the like, etc.

It is another object of the present invention to provide in combination a ten-key control pad and cruise control system which is more efficient than other cruise control devices and control switches as taught within the prior art.

Still a further object of the present invention is to provide in combination a ten-key control pad which can be easily pre-programmed.

Other objects and advantages will be seen when taken into consideration with the following specification and drawings.

DETAILED DESCRIPTION OF THE DRAWINGS

Figure 5:
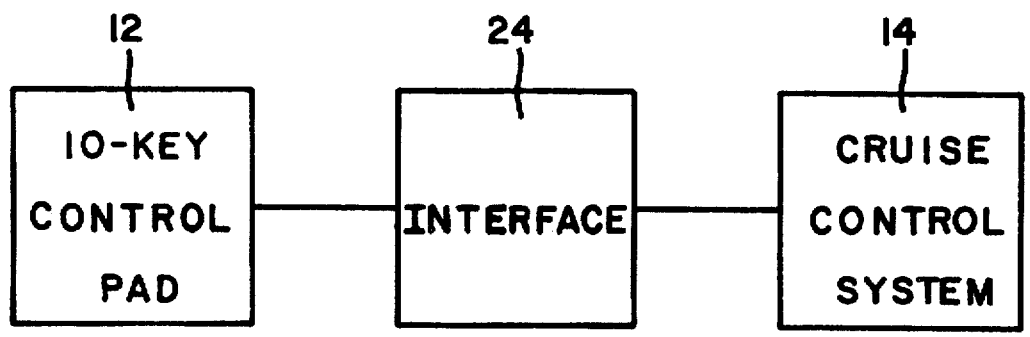
FIG. 5 is substantially a plan view for the present invention.

Referring now to the drawings in detail wherein like characters refer to like elements throughout the drawings. Within FIG. 1, (10) represents an overview of the present invention which is substantially a manually operable ten-key control pad (12) which is used to activate and deactivate multiple functions of a cruise control system (14) within a vehicle. It is to be noted that the cruise control system (14), as shown in FIG. 5, is only exemplary of a cruise control system of engineering choice and is not to be considered a part of the claimed invention, but is considered to be a part of a unique combination when combined with a typical ten-key control pad (12), with the combination providing most unusual results, heretofore not seen nor taught within the prior art.

Referring now to the ten-key control pad (12), which is used to activate and deactivate functions of a cruise control system (14). The ten-key control pad (12) may be substantially any typical ten-key control pad having numbers arranged in the well known ten-key pattern, such as found on most computer keyboards, calculators, adding machines, etc. This allows substantially any driver who is knowledgeable with the well known typical ten-key pattern to easily operate the cruise control system (14) in a controlled manner without ever having to remove their eyes from the road.

Figure 4:
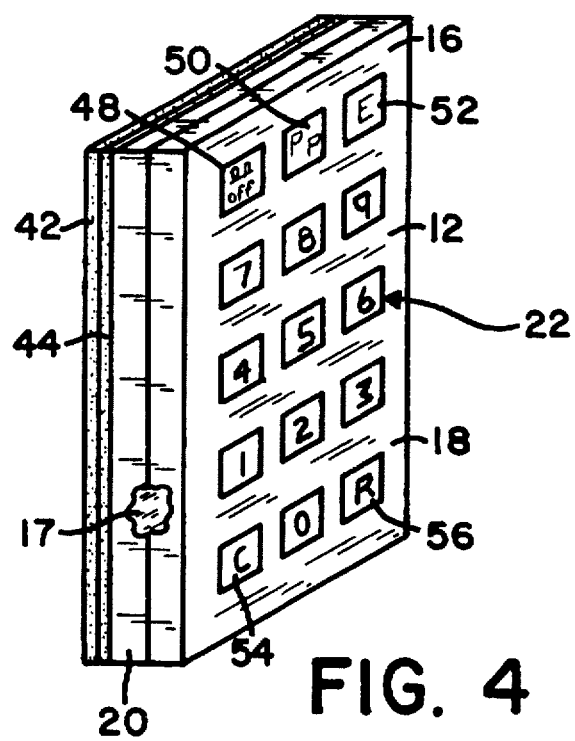
FIG. 4 is substantially a perspective view of the invention.

Ten-key control pad (12) comprising in combination; a housing (16) having a front panel (18) interconnected to a rear panel (20), (see FIG. 4), thus forming an interior hollow cavity (17), (as partially seen within FIG. 4). Cavity (17) containing appropriate electrical components with circuitry (not shown) for activating and deactivating functions of cruise control system (14). It is to be noted that said components and circuitry are of engineering choice, as such components and circuitry are well known in the art. The housing (16) can be made from substantially any suitable material of engineering choice, such as plastic or the like, and can be of any suitable shape and size of engineering choice, with the front panel (18) having multiple buttons (represented by arrow 22) positioned in the typical ten-key pattern thereon. It is to be noted that buttons (arrow 22) can be any suitable buttons of engineering choice, such as the buttons may be touch activated switches, or push button activated switches, or the like, (switches and circuitry not shown).

It is to be understood that ten-key control pad (12) is interconnected by an interface (24) of engineering choice to cruise control system (14). Any suitable interface of engineering choice may be used and therefore (24) is only exemplary of one possible interface, and the components and electronics of the interface are not herein shown, as many different types of interface means are well known in the art.

Figure 1:
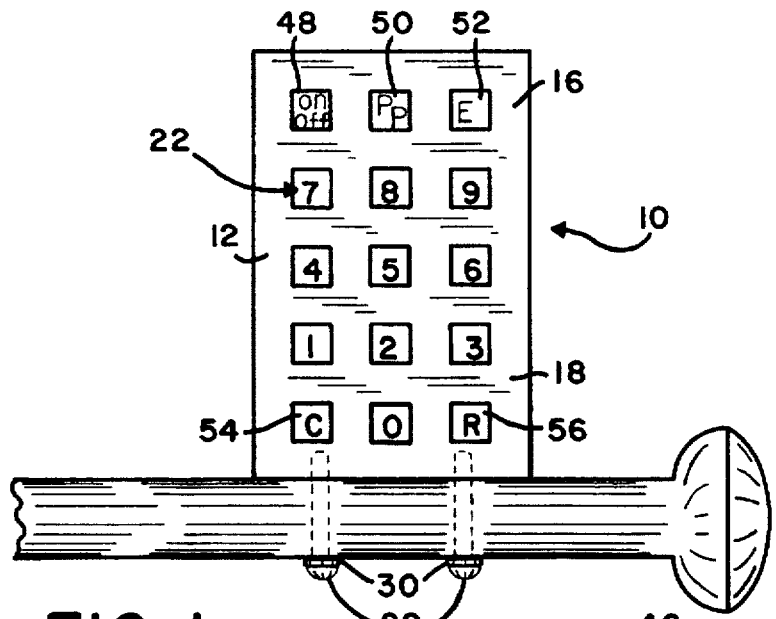
FIG. 1 is substantially a frontal view of the invention when attached to a typical steering wheel mounted gear shift lever.

Ten-key control pad (12) is of a shape and size to allow the driver to easily install the control pad (12) substantially at any suitable location of choice, or the control pad (12) may be installed within the vehicle (not shown) at any location of choice at the point of manufacture. For example, (as shown in FIG. 1) control pad (12) may be easily removably installed on a pre-existing steering wheel mounted gear shift lever (26) by any suitable attachment means of engineering choice, such as by multiple bolts (28) and multiple washers (30), or if preferred, clamps or the like.

Figure 2:
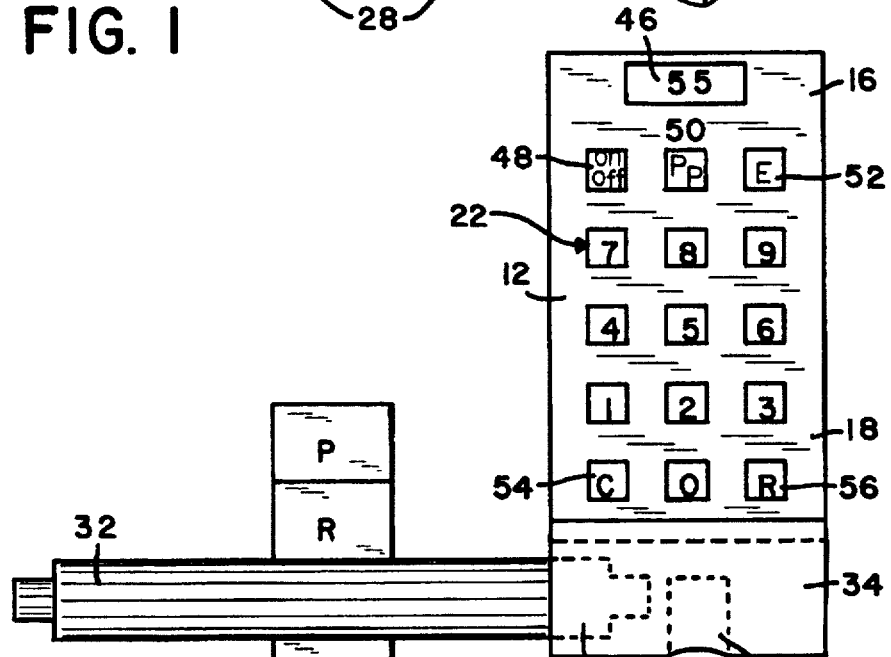
FIG. 2 is substantially a frontal view of a second embodiment for the present invention when attached to a typical floor mounted gear shift lever.
Figure 3:
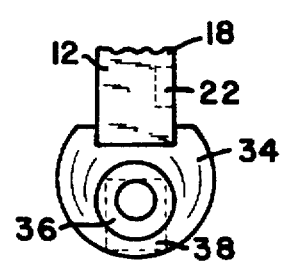
FIG. 3 is substantially a partial side view of the embodiment of FIG. 2.

Exemplary of a second mounting location is illustrated within FIG. 2, wherein we show a second embodiment for control pad (12) which is removably attached to a floor mounted gear shift lever (32). In this embodiment, control pad (12) further includes a removable mounting assembly, comprising an integrally formed substantially circular elongated member (34) having a first and a second cavity (36 & 38) therein at a location of engineering choice, with cavity (36) being of a shape and size to frictionally yet removably retain one end of lever (32) therein. In this embodiment, the control pad (12) is slidably rotatable about the first end of lever (32) and thus, allows the driver to position the angle of control pad (12) into a position of individual choice. Referring now to the second cavity (38) which is of a shape and size to be removably frictionally slidably positioned on a typical straight gear shift lever (40) (shown in ghost lines) which is mounted on the floor of the vehicle. Again, this is only exemplary of one mounting means, thus, the invention is not to be limited to such a mounting, as any suitable mounting means of engineering choice may be used.

Referring now to FIG. 4, wherein we show a third mounting means for the present invention. It is to be noted that the control pad (12) may include a loop and pile fastener, such as a first and second VELCRO strip (42 & 44) on the backside of housing (16) which allows the control pad (12) to be removably positioned at substantially any location of choice within the vehicle, for example, if the user wishes to install the control pad (12) on the dash of the vehicle (not shown), they simply attach (with glue or the like) the first strip (42) to the dash at its desired location, thereafter, the second strip (44) may be firmly pressed and positioned on top of and in alignment with the first strip (42), thus, removably attaching control pad (12) to the dash (not shown) of the vehicle.

The above various mounting means for control pad (12) are exemplary of after market installation, as the control pad

(12) in combination with cruise control system (14) may be easily installed as one unit at the point of manufacture, and the control pad (12) may be incorporated within the dash of the vehicle, if so desired, or it may be installed at any location of engineering choice.

Referring now to FIG. 2, wherein we also show the control pad (12) having a current speed digital display (46) which may be an LED (not shown) if so desired, and the display shows a blank reading when the cruise control system (14) is off until the driver activates the system, after which, the display (46) will flash the desired speed until that speed is attained, then flashing may stop. It is to be noted that this option can be incorporated into each of the different embodiments of engineering choice, if so desired.

It is to be also noted that if so desired, each of the buttons (arrow 22) may also include LED's, (not shown) which will allow the driver to easily view the control pad (12) while driving the vehicle at night. It is contended by the applicants that there is no need to show the LED's and related circuitry, as such is very well known in the art. Also if preferred, control pad (12) head (not shown) may be battery operated.

Referring in particular to buttons, (arrow 22) which include multiple numerical buttons (numbered from 0–9) arranged in the typical ten-key pattern as shown in FIGS. 1, 2 & 4. An on/off button (48) having typical circuitry and components relating to on/off functions for activating and deactivating cruise control system (14) and which may be illuminated by an LED lamp which glows green when the system is switched on, and glows red when the system is off. A pre-programmed button (50) (labeled "P.P.") which may expedite the use of the present invention and which allows the driver to pre-program the functions of the cruise control system (14) by any suitable programmable means of engineering choice, for example if so desired, the "P.P" button functions as any prior art program button, such as may be found on a typical call back phone system, or the program button found on a car radio and/or C.B. radio, or the like. An enter button, (52) which again includes components and circuity of engineering choice and which functions in the same manner as a any typical enter button as found in the prior art. A coast button (54) having functions which will be defined within the following detailed operation of the present invention, and a resume button (56), also defined in the following.

Detailed operation and/or method for using, in combination, a ten-key control pad (12) and a vehicle cruise control system (14), comprised of the following steps;

a. switching on/off button (48) on ten-key control pad (12) to an on position;

b. determining the desired speed of travel, between 15 MPH and 65 MPH;

c. pressing a first button on ten-key control pad (12) having a numerical value thereon which is equal to the value of the first digit, between 1 and 6, of the desired speed of travel;

d. pressing a second button on ten-key control pad (12) having a numerical value thereon which is equal to the value of the second digit of said desired speed of travel;

e. pressing enter 52);

f. driving at the desired speed of travel until a different speed of travel is desired; and f. switching the on/off button (48) to an off position when the system (14) is no longer required.

It is to be noted that the above method of use is only exemplary of one manner in which the ten-key control pad (12) and the cruise control system (14) may be used, as the system may be used in various ways of choice. Thus, the following is another example of use for the present invention.

A method of using in combination, a ten-key control pad (12) and a vehicle cruise control system (14). With pad (12) having been pre-programmed (P.P.) by the user to their individual liking and thus, will allow only one button when pushed to automatically increase or decrease the current speed of travel to equal the desired speed of travel, whereby, buttons (arrow 22) having numerals 1–6 function individually as follows; #1 increases and/or decreases current speed of travel to between 15 and 19 MPH, #2 increases and/or decreases current speed of travel between 20 and 29 MPH, #3 increases and/or decreases current speed of travel between 30 and 39 MPH, #4 increases and/or decreases current speed of travel between 40 and 49 MPH, #5 increases and/or decreases current speed of travel between 50 and 59 MPH, and #6 increases and/or decreases current speed of travel between 60 and 65 MPH, with the method of use comprising of the following steps;

a. switching on/off button (48) on ten-key control pad (12) to an on position;

b. pressing (P.P.) button (50);

c. determining desired speed of travel;

d. pressing the pre-programmed button of choice which reflects the desired speed of travel, for example, if 15 MPH is the desired speed of travel, the user presses #1, or if the desired speed of travel is 43 MPH, the user presses #4, etc.;

e. driving at the desired speed of travel until a different speed of travel is desired; and f. switching the on/off button (48) to an off position when the system (14) is no longer required.

It is to be again noted that the above method of use is only exemplary of one possible program setting, as the user may program the system in any manner of their choice, and thus the combinations possible are much to numerous to provide herein. It is also to be noted that if the user performs the afore noted method steps, and then determines that a different speed of travel is desired, they only need to push a single button from 1–6 which is either greater or less than the current speed of travel and the newly desired speed of travel will automatically be attained.

Referring now to coast button (54) which allows the driver to slow the current speed of travel without interring a new speed of travel, simply by pressing button (54) which automatically slows the vehicle until the driver releases the button (54), after which the vehicle returns to the original desired speed of travel.

Referring now to resume button (56) which allows the driver to resume the previous speed of travel after braking, thus, the driver need not reset the system.

It will now be seen that we have herein provided a unique combination including a ten-key control pad which activates and deactivates functions of a cruise control system within a vehicle.

It will further be seen that we have herein provided in combination a ten-key control pad and a cruise control system which provides most unusual results and allows for various functions of the cruise control system to be activated and/or deactivated in a manner heretofore not seen nor taught.

It will also be seen that we have herein provided in combination a ten-key control pad and a cruise control system which is economical to manufacture and produce.

It will further be seen that we have herein provided in combination a ten-key pad which may be either touch activated and/or push-button activated for activating and deactivating functions of a cruise contol system.

It will also be seen that we have herein provided a ten-key pad which may includes multiple L.E.D.s (light emitting diodes) which illuminate when activated for night driving.

It will further be seen that we have herein provided a ten-key pad head which transmits to the receiving head the speed desired, then it transmits through the cruise control regulator, and servo, much in the same way as the present day cruise controls.

It will also be seen that we have herein provided in combination a ten-key control pad and a cruise control system which allows the driver to pre-set the ten-key pad i.e., from 15 MPH to 65 MPH without taking your eyes off of the road.

It will further be seen that we have herein provided in combination a ten-key pad and a cruise control system which substantially anyone can easily use, as the typical ten-key pad is used most everyday by most individuals, when either at home or at work.

Still further it will be seen that we have herein provided in combination a ten-key pad and a cruise control system which can be easily installed at substantially any location of choice within a vehicle, for example, if so desired, the ten-key pad can be installed on the shifting lever of the vehicle with only one 12 volt connection.

It will also be seen that we have herein provided a ten-key pad and cruise control system which in combination solves or eliminates the present day wiring of conventional cruise control heads.

Still further it will be seen that we have herein provided a ten-key operated control pad for activation of a cruise control system within a vehicle, which when used in combination, will provide most unusual results and allow a driver to easily activate the cruise control system by use of the ten-key pad and well known ten-key pattern. This advantage and unique combination has not been taught within the prior art, nor has it been suggested and/or recognized.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatuses.

Having described our invention, what we claim as new and wish to secure by a LETTERS PATENT is:

1. A method of operating a vehicle cruise control system, the system comprising a control pad connected to a vehicle cruise control for maintaining a vehicle at a desired speed of travel, the control pad including an on/off button, a pre-programming button, and six buttons with numerical designations of 1–6 respectively, each of the six buttons being assigned a different vehicle speed range within which a specific vehicle speed could be pre-programmed by a user, :the pre-programmed vehicle speed for each button increasing in relation to the numerical designation of the button, the method comprising the steps of:

1) pre-programming each of the buttons with a specific vehicle speed within the speed range assigned to each button;

2) pressing the on/off button to activate the cruise control system for permitting the user to set the vehicle speed;

3) pressing the pre-programming button;

4) selecting and pressing one of the six buttons having a pre-programmed speed which corresponds to a desired speed of travel, for setting the vehicle speed to the pre-programmed vehicle speed of the selected button;

5) selecting and pressing a second one of the six buttons, when a different speed of travel is desired, for resetting the vehicle speed to the pre-programmed vehicle speed of the second selected button; and 6) pressing the on/off button to deactivate the cruise control system when a set vehicle speed is no longer desired.

2. A The method of operating a vehicle cruise control system as recited in claim 1, further including the steps of:

1) pressing a coast button on the control pad for reducing the speed of vehicle; and 2) releasing the coast button for returning the vehicle speed to the preprogrammed vehicle speed of the selected button.

* * * * *